United States Patent
Fischer et al.

(10) Patent No.: US 8,990,163 B2
(45) Date of Patent: Mar. 24, 2015

(54) SNAPSHOT OF DISTRIBUTED ENTERPRISE BUSINESS DATA STORED IN VARIOUS CLOUD SERVICES

(75) Inventors: Martin Fischer, Heidelberg (DE); Olaf Schmidt, Walldorf (DE)

(73) Assignee: SAP SE, Walldorf (DE)

( * ) Notice: Subject to any disclaimer, the term of this patent is extended or adjusted under 35 U.S.C. 154(b) by 43 days.

(21) Appl. No.: 13/327,679

(22) Filed: Dec. 15, 2011

(65) Prior Publication Data

US 2013/0159256 A1 Jun. 20, 2013

(51) Int. Cl.
*G06F 17/30* (2006.01)

(52) U.S. Cl.
CPC ...................................... *G06F 17/30* (2013.01)
USPC ............ 707/649; 707/736; 707/741; 707/749

(58) Field of Classification Search
CPC ................................................ G06F 17/30088
USPC .................................. 707/736, 741, 749, 649
See application file for complete search history.

(56) References Cited

U.S. PATENT DOCUMENTS

| | | | | |
|---|---|---|---|---|
| 7,921,299 B1* | 4/2011 | Anantha et al. | ................ | 713/187 |
| 2004/0230559 A1* | 11/2004 | Newman et al. | ................... | 707/1 |
| 2005/0108536 A1* | 5/2005 | Karimisetty et al. | ......... | 713/176 |
| 2005/0108537 A1* | 5/2005 | Puri et al. | ...................... | 713/176 |
| 2007/0156742 A1* | 7/2007 | Gonzalez | ....................... | 707/102 |
| 2008/0034013 A1* | 2/2008 | Cisler et al. | .................... | 707/203 |
| 2009/0150906 A1* | 6/2009 | Schmidt et al. | ................ | 719/317 |
| 2009/0158367 A1* | 6/2009 | Myers et al. | ................... | 725/109 |
| 2009/0235283 A1* | 9/2009 | Kim et al. | ...................... | 719/328 |
| 2009/0254636 A1* | 10/2009 | Acedo et al. | ................... | 709/220 |
| 2010/0332479 A1* | 12/2010 | Prahlad et al. | ................ | 707/741 |
| 2010/0332530 A1* | 12/2010 | McKelvie et al. | ............. | 707/770 |
| 2011/0055385 A1* | 3/2011 | Tung et al. | ..................... | 709/224 |
| 2011/0126214 A1* | 5/2011 | O'Farrell et al. | ............. | 719/316 |
| 2011/0238555 A1* | 9/2011 | Rosenthal | ........................ | 705/37 |
| 2012/0089781 A1* | 4/2012 | Ranade et al. | ................ | 711/118 |
| 2012/0191969 A1* | 7/2012 | Clifford et al. | ............... | 713/150 |
| 2012/0246130 A1* | 9/2012 | Schmidt | ......................... | 707/694 |
| 2012/0246260 A1* | 9/2012 | Kama | ............................ | 709/217 |
| 2012/0265741 A1* | 10/2012 | Moon et al. | .................... | 707/694 |
| 2013/0007183 A1* | 1/2013 | Sorenson et al. | ............. | 709/213 |
| 2013/0007219 A1* | 1/2013 | Sorenson et al. | ............. | 709/219 |
| 2013/0036115 A1* | 2/2013 | Schwarz et al. | .............. | 707/736 |

\* cited by examiner

*Primary Examiner* — Noosha Arjomandi
(74) *Attorney, Agent, or Firm* — Mintz Levin Cohn Ferris Glovsky and Popeo, P.C.

(57) ABSTRACT

A system and method for generating a snapshot of data associated with one or more cloud-based applications are disclosed. Application programming interfaces (APIs) and connections associated with one or more applications registered and on a server computer and used by a company are retrieved from a table by a lookup. All data associated with the one or more applications based on the APIs and connections are also retrieved. The data associated with the one or more applications is then mapped to a client-specific representation and data format. The data associated with the one or more applications is converted to the client-specific representation and data format.

9 Claims, 2 Drawing Sheets

SNAPSHOT OF DISTRIBUTED ENTERPRISE BUSINESS DATA STORED IN VARIOUS CLOUD SERVICES

TECHNICAL FIELD

The subject matter described herein relates to hosted computing services, and more particularly for generating a snapshot of distributed enterprise business data stored in various cloud services.

BACKGROUND

Cloud computing is a term that describes delivering computing services and applications as a service hosted on a network such as the Internet, rather than as a product. Cloud computing is an emerging and well accepted technology that will be widely used in the future, especially for business applications. The cloud computing approach offers companies the possibility to significantly reduce the total cost of ownership (TCO) of business applications by using various computing, storage, and infrastructure and management services in the "cloud."

Some current legacy business applications are considered on-premise, that is, bound to a company network and where data is stored on local storage systems. Thus, all data is under control of the company, and usually important data is regularly archived and is accessible 24 hours a day 7 days a week.

When switching to cloud based applications, such control and archival processes are no longer necessary. Different cloud services are typically utilized by these applications which results in a distribution of business relevant data. There still exists the need to keep track of data that leaves a company network in order to fulfill legal requirements (archiving, audits, etc.), or to prevent data loss when a particular cloud service goes offline (technical problems, insolvency, etc.). Currently there is no solution to keep track of the distributed stored data, to gather and retrieve business data from remote cloud services and store a company's data in an appropriate format (e.g. XML) in a central repository maintained by the company.

SUMMARY

In one aspect, a computer-implemented method for generating a snapshot of data associated with one or more cloud-based applications is presented. The method includes the steps of retrieving, by a lookup using a process engine implemented by one or more processors, application programming interfaces (APIs) and connections associated with one or more applications registered and on a server computer and used by a company. The method further includes the steps of retrieving, using the process engine, all data associated with the one or more applications based on the APIs and connections retrieved, and mapping the data associated with the one or more applications to a client-specific representation and data format. The method further includes the step of converting the data associated with the one or more applications to the client-specific representation and data format.

Implementations of the current subject matter can include, but are not limited to, systems and methods consistent including one or more features are described as well as articles that comprise a tangibly embodied machine-readable medium operable to cause one or more machines (e.g., computers, etc.) to result in operations described herein. Similarly, computer systems are also described that may include one or more processors and one or more memories coupled to the one or more processors. A memory, which can include a computer-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

Implementations of the current subject matter can provide one or more advantages. For example, the described implementations help a company fulfill legal requirements when cloud based applications are used for business-relevant processes.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to an enterprise resource software system or other business software solution or architecture, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, similar reference numbers denote similar structures, features, or elements.

DETAILED DESCRIPTION

To address these and potentially other issues with currently available solutions, methods, systems, articles of manufacture, and the like consistent with one or more implementations of the current subject matter can, among other possible advantages, enable companies to trigger a data snapshot when cloud-based applications are utilized for important business tasks.

Figure 1:
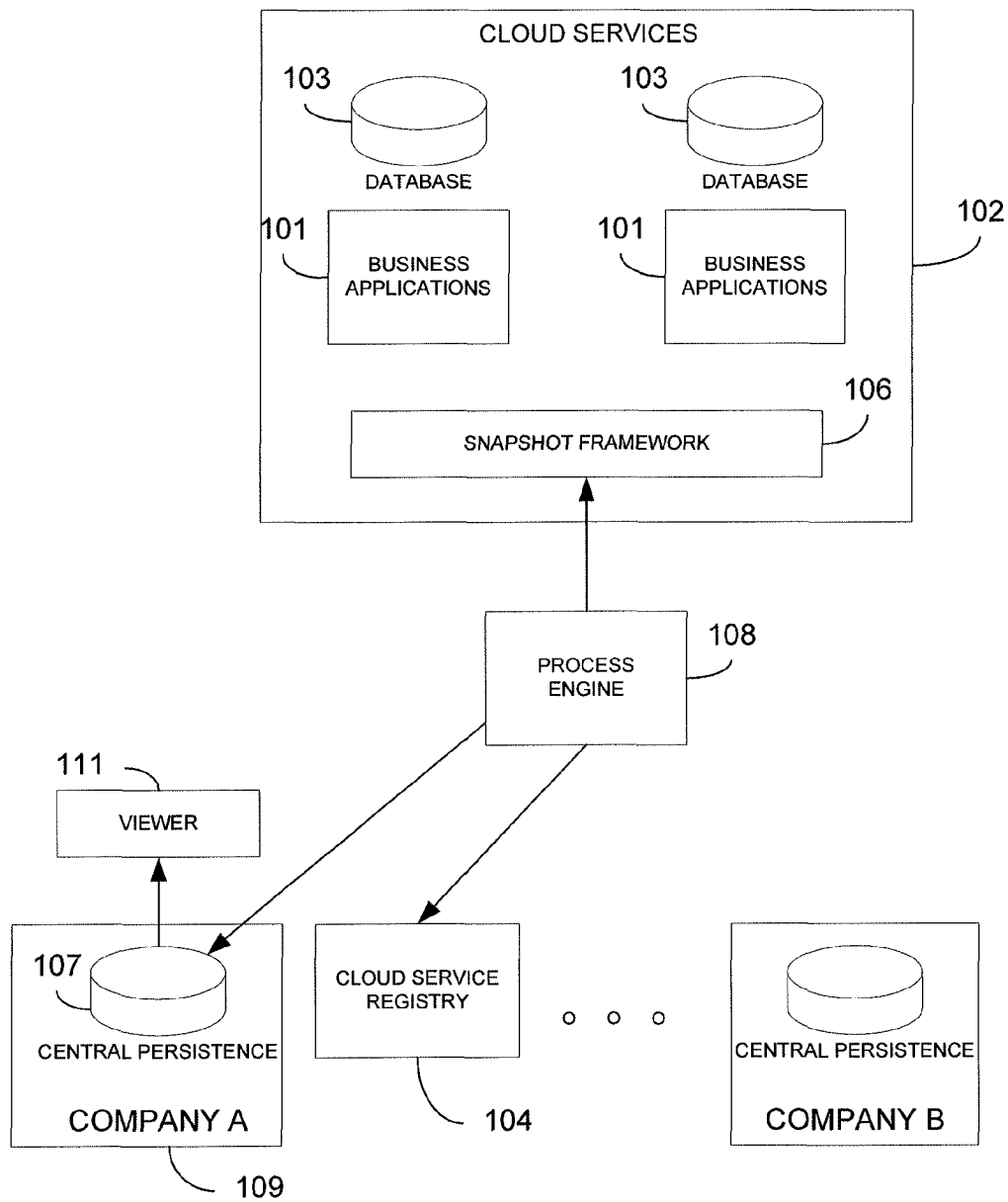
FIG. 1 is a diagram illustrating aspects of a system showing features consistent with implementations of the current subject matter.

FIG. 1 illustrates a system 100 for providing a snapshot of distributed enterprise business data stored in various cloud services. The system 100 includes cloud services 102, a cloud service registry 104, a snapshot framework 106, and a process engine 108. The cloud services 102 provides certain business applications 101 and holds certain business data 103, preferably as a database such as a relational database or multi-tenant database. The cloud services 102 provides application programming interfaces (APIs) for each application service that it provides, which enables access to the business data assigned to the business service of a certain company or "tenant" of the cloud services 102.

The cloud service registry 104 provides a memory where the information needed to access each cloud service (connection data, cloud service API implementations, etc.) is configured. The cloud services 102 also provides a snapshot framework 104 that utilizes implementations of the APIs for registered cloud services to retrieve business data. The snapshot framework 106 provides data-type mapping functionality to retrieve data from cloud service-specific data and to map that data to client-specific data, as well as to convert this data into a desired format of snapshot data and snapshot metadata. The retrieved and converted snapshot data (business data) and the snapshot metadata (time, information, user information, reason for snapshot, etc.), hereinafter referred to as "snapshot data," is stored in a central persistence 107 for each company or tenant 109. A generic viewer 111 is available to generate a visualization of the snapshot data to enable a user to explore the stored snapshot data. Optionally, viewing functionality via the viewer 111 may be registered in the snapshot framework 106 or cloud service registry 104 for particular snapshot data.

The snapshot framework 106 and the cloud service APIs cooperate with a process engine 108 to provide functionality to schedule, monitor and audit the snapshot process. The process engine 108 can support different types of snapshots: 1) on-demand (i.e. snapshots at a certain point in time); 2) periodic; and/or 3) continuously (i.e. incremental snapshots, where delta information is stored as soon as remote data is modified).

Figure 2:
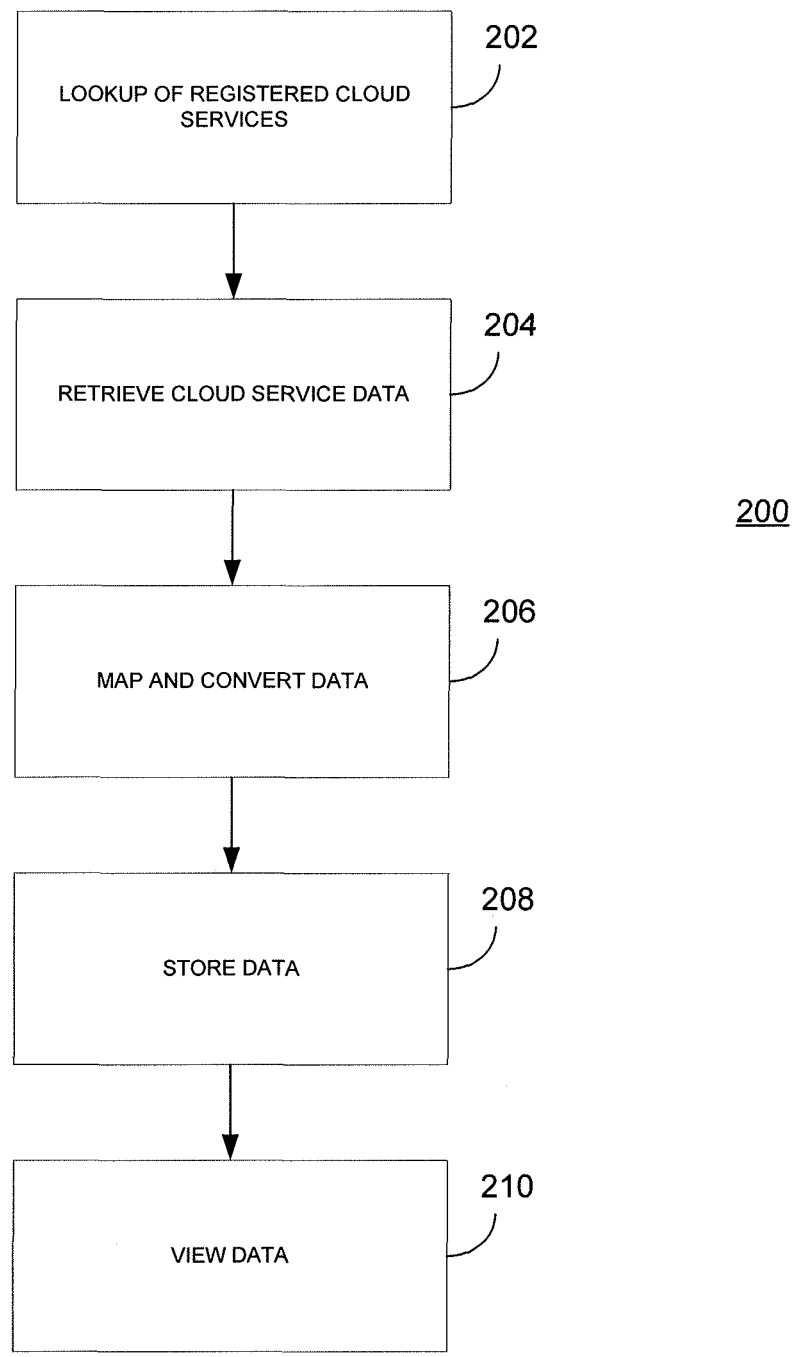
FIG. 2 is a process flow diagram illustrating aspects of a method having one or more features consistent with implementations of the current subject matter.

FIG. 2 illustrates a snapshot process 200, triggered on-demand. At 202, registered cloud services, i.e. cloud services stored in a cloud service registry, are accessed by a lookup. In the cloud service registry, the connections and API implementations of the cloud services are retrieved. In some implementations, this step can include restricting the snapshot to a subset of the registered cloud services. At 204, cloud service data is retrieved, in which the API implementations accessed at 202 are called to retrieve all data of every relevant cloud service.

At 206, the retrieved cloud service data is mapped and converted. For instance, the data retrieved at 204 is mapped to a client-specific representation and converted into a desired data format according to the rules configured in the snapshot framework. Corresponding metadata containing administrative information for the snapshot is then also created. At 208, the converted data is stored in a central storage location, or central persistence, associated with a company requesting the cloud services. Then, at 210, the stored data and metadata can be accessed by a user associated with the company, and analyzed with appropriate visualization components.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A computer-implemented method comprising:

retrieving, by a lookup performed by a process engine comprising one or more processors and from a cloud service registry connected to the process engine, application programming interfaces (APIs) and connections associated with one or more cloud computing applications provided by a cloud computing server connected to the process engine, the cloud computing server comprising a snapshot framework that includes at least one processor;

retrieving, by the process engine from the snapshot framework of the cloud computing server, a snapshot of distributed data associated with the one or more cloud computing applications based on the APIs and connections retrieved;

mapping, by the process engine, the distributed data in the snapshot to a client-specific representation and data format; and converting, by the process engine, the distributed data in the snapshot to the client-specific representation and data format;

generating, by the process engine, metadata representative of the converted data in the client-specific representation and data format; and generating, by the process engine a visualization of the distributed data in the snapshot in the client-specific representation and data format based on the metadata.

2. A computer-implemented method in accordance with claim 1, wherein the distributed data in the snapshot includes one or more business objects.

3. A system comprising:

at least one programmable processor; and a machine-readable medium storing instructions that, when executed by the at least one processor, cause the at least one programmable processor to implement modules comprising:

a cloud service registry associated with a server and on which application programming interfaces (APIs) and connections associated with one or more cloud computing applications are registered;

a process engine for retrieving the APIs and connections associated with the one or more cloud computing applications, and for retrieving from the server a snapshot of all data associated with the one or more cloud computing applications based on the APIs and connections retrieved; and a snapshot framework for mapping data in the snapshot to a client-specific representation and data format, and for converting the data in the snapshot to the client-specific representation and data format;

generating, by the process engine, metadata representative of the converted data in the client-specific representation and data format; and generating, by the process engine a visualization of the distributed data in the snapshot in the client-specific representation and data format based on the metadata.

4. The system in accordance with claim 3, wherein the data in the snapshot includes one or more business objects.

5. A non-transitory computer program product comprising a machine-readable medium storing instructions that, when executed by at least one programmable processor, cause the at least one programmable processor to perform operations comprising:

receiving, by a process engine comprising one or more processors and from a tenant of a multi-tenant computing system, a request to retrieve a snapshot of distributed business data associated with a plurality of different cloud services from a computing processor hosting the plurality of different cloud services, the request comprising data associated with an application programming interface configured to connect the tenant with the one or more cloud services;

sending, by the process engine, the request to the computing processor, the computing processor obtaining the snapshot of the distributed business data from a multi-tenant database associated with the plurality of different cloud services in accordance with the data associated with the application programming interface; and sending, by the process engine, the snapshot of the distributed business data to the tenant that displays the business data;

wherein the retrieving of the snapshot of distributed business data associated with the plurality of different cloud services comprises restricting the snapshot to a subset of the plurality of different cloud services.

6. The non-transitory computer program product of claim 5, wherein the snapshot of the distributed business data comprises data characterizing: a time of the request, a user requesting the business data, and a reason for requesting the business data.

7. The non-transitory computer program product of claim 6, wherein the process engine sends the snapshot of the distributed business data to the tenant on- demand from a user.

8. The non-transitory computer program product of claim 6, wherein the process engine periodically sends the snapshot of the distributed business data to the tenant.

9. The non-transitory computer program product of claim 6, wherein the process engine continuously sends the snapshot of the distributed business data to the tenant.

* * * * *